United States Patent [19]
Kannari et al.

[11] Patent Number: 5,757,866
[45] Date of Patent: May 26, 1998

[54] DIVERSITY RECEIVER

[75] Inventors: Hideyuki Kannari, Kawasaki; Manabu Shibata; Hiroki Oikawa, both of Sendai, all of Japan

[73] Assignee: Fujitsu Limited, Kanagawa, Japan

[21] Appl. No.: 559,162

[22] Filed: Nov. 10, 1995

[30] Foreign Application Priority Data

Apr. 26, 1995 [JP] Japan ................................ 7-102356

[51] Int. Cl.[6] ................................................ H04B 7/10
[52] U.S. Cl. ........................ 375/347; 455/132; 455/135
[58] Field of Search ................................ 375/347, 231, 375/349; 455/135, 139, 137, 263, 273, 276.1, 304, 132; 327/105, 355, 360, 361, 354; 370/321

[56] References Cited

U.S. PATENT DOCUMENTS

| | | | |
|---|---|---|---|
| 4,710,945 | 12/1987 | Bocci et al. | 375/347 |
| 5,321,850 | 6/1994 | Backstrom et al. | 375/347 |
| 5,440,590 | 8/1995 | Birchler et al. | 375/347 |
| 5,481,569 | 1/1996 | Conti et al. | 455/139 |
| 5,487,091 | 1/1996 | Jasper et al. | 455/135 |

Primary Examiner—Stephen Chin
Assistant Examiner—Joseph Roundtree
Attorney, Agent, or Firm—Helfgott & Karas, P.C.

[57] ABSTRACT

A diversity receiver respectively receiving signals in two branches includes two demodulating sections for producing respective amplitude and phases of received signals at a unit of symbol. The receiver includes a memory access section for producing an amplitude ratio of the amplitude of the received signals and a phase difference between the phases of the received signals. The receiver further includes a storage section for storing at least one relative phase difference between a phase of a vector-combined signal combined based on the received signals and one of the phases of the received signals for an address given by the amplitude ratio and the phase difference of the received signals. The phase of the vector-combined signal is previously calculated based on the amplitude ratio, the phase difference, and the one of the phases of the received signals. The receiver further includes an adding section for adding the relative phase difference produced from the storage section being addressed by the amplitude ratio and the phase difference produced from the memory access section to the one of the phases of the received signals to produce the phase of the vector-combined signal combined based on the received signals.

12 Claims, 11 Drawing Sheets

F I G. 7

δr: 4dB, δθ=56.25°

| θ1 (°) | r1 | | θ2 (°) | r2 | | θ_MRC (°) | D (°) |
|---|---|---|---|---|---|---|---|
| | μV | dBμ | | μV | dBμ | | |
| 45 | 0.5011872 | −6 | 101.25 | 0.7943282 | −2 | 86.083749 | 41.083749 |
| 45 | 0.6309573 | −4 | 101.25 | 1.0000000 | 0 | 86.083749 | 41.083749 |
| ... | ... | ... | . | ... | ... | ... | ... |
| 45 | 19.952623 | 26 | 101.25 | 31.622777 | 30 | 86.083749 | 41.083749 |
| 45 | 25.118864 | 28 | 101.25 | 39.810717 | 32 | 86.083749 | 41.083749 |
| ... | ... | ... | ... | ... | ... | ... | ... |

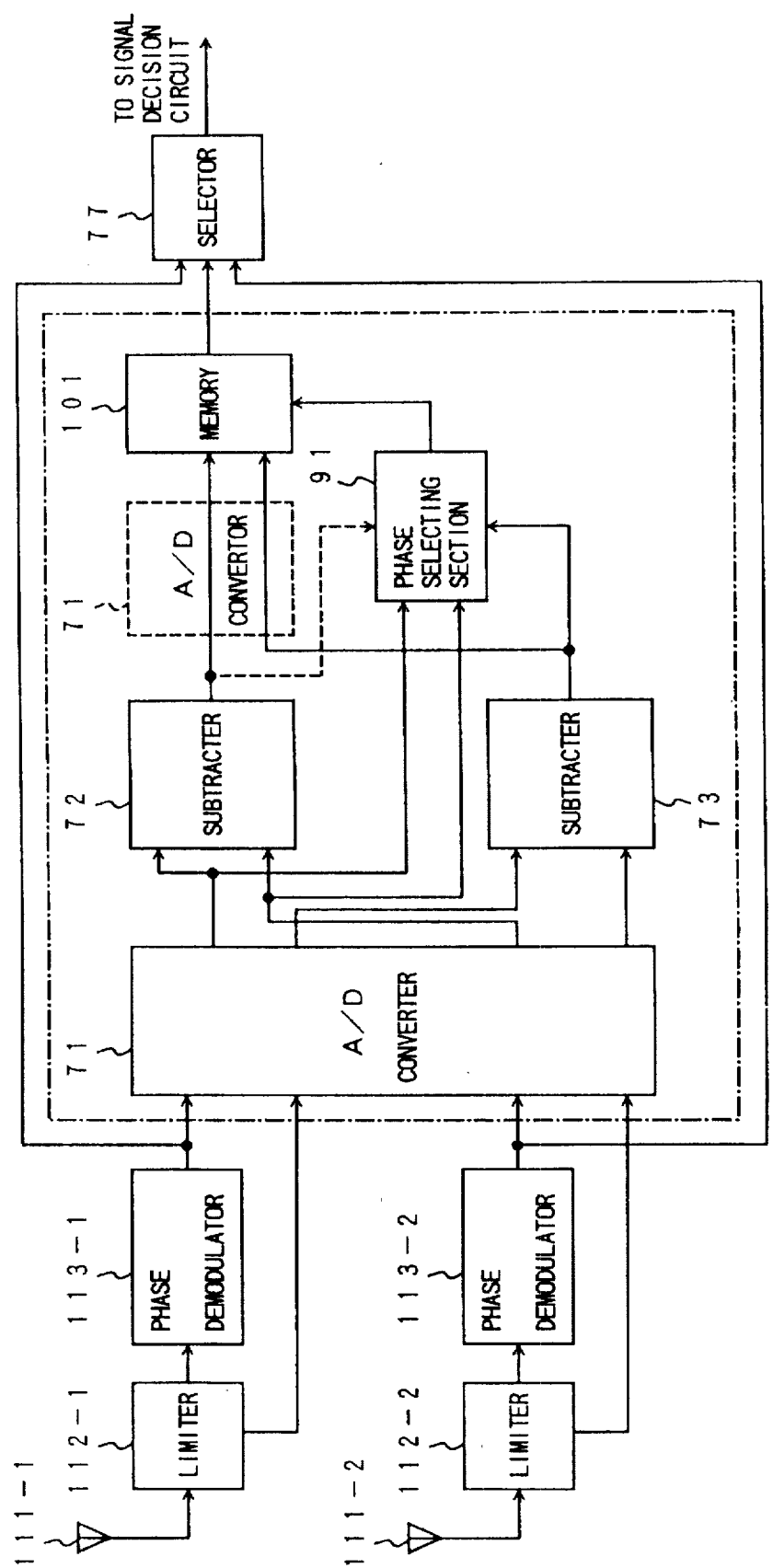

DIVERSITY RECEIVER

BACKGROUND OF THE INVENTION

1. Field of the Invention

The present invention generally relates to a diversity receiver, and more particularly, to a diversity receiver for improving signal reception performance in a receiver side of a transmission system in which information is transmitted through a radio transmission path where transmission characteristics fluctuate.

2. Description of the Related Art

In a radio transmission path where transmission characteristics fluctuate due to reflection-and-attenuation characteristics by buildings and mountains and weather phenomena such as rain, a variety of diversity receiving systems are applied to a receiver to reduce degradation in transmission quality which occurs due to the fluctuation of the transmission characteristics. More specifically, in a mobile radio communication system using a radio frequency in UHF and VHF bands, a large number of transmission paths are constructed including variation of relative positions between the buildings distributed in an urban area, a moving radio station, and a base station. A signal to be received in the radio station or the base station is given by a vector sum of received signals through these transmission paths. Therefore, in the signals received in the radio station and the base station, extremely strong fading occurs as compared to a terrestrial radio transmission path and a satellite radio transmission path. In such a mobile radio communication system, to reduce the degradation in the transmission quality due to the fading, the diversity receiving system is used in the receiver side.

FIG. 1 shows a block diagram of a configuration example of a conventional diversity receiver. In the radio system shown in FIG. 1, an angular modulating method such as PSK and FSK is used in which a phase of a carrier signal is changed according to the transmission information. In FIG. 1, an antenna 111-1 is connected to an input of a limiter 112-1, and a first output of the limiter 112-1 is connected to a first input of a digital signal processor (which is referred to as DSP, hereinafter) 114 through a phase demodulator 113-1. A second output of the limiter 112-1 is connected to a second input of the DSP 114. An output of the DSP 114 is connected to a signal decision circuit 115 producing a demodulated signal. An antenna 111-2 is connected to an input of a limiter 112-2, and a first output of the limiter 112-2 is connected to a third input of the DSP 114 through a phase demodulator 113-2. A second output of the limiter 112-2 is connected to a fourth input of the DSP 114.

In the diversity receiver shown in FIG. 1, the antennas 111-1, 111-2 individually construct branches. Each of signals received through these branches is divided into a first component in which an amplitude component is eliminated and a second component of the amplitude component by the limiters 112-1, 112-2. The phase demodulators 113-1, 113-2 respectively phase-demodulate these first components and produce analog phase-demodulated signals which are provided to the DSP 14.

In the following descriptions, the analog phase-demodulated signal from the phase demodulator 113-1 is referred to as a first phase signal, and the analog phase-demodulated signal from the phase demodulator 113-2 is referred to as a second phase signal. For the above-mentioned second components, the second component from the limiter 112-1 is referred to as a first amplitude signal, and the second component from the limiter 112-2 is referred to as a second amplitude signal.

The DSP 114 is provided with the first amplitude signal and the second amplitude signal, and calculates squares R1, R2 of amplitude values r1, r2 of the received signals based on these amplitude signals. By a squaring operation, the amplitude values r1, r2 are respectively weighted by themselves. In the DSP 114, the received signal in the first branch is represented by a phase θ1 given by the first phase signal and the square R1 on angular coordinates, and the received signal in the second branch is represented by a phase θ2 given by the second phase signal and the square R2 on the angular coordinates. Further, by vector-summing these received signals represented by the angular coordinates, a phase component of a vector sum of these received signals may be obtained.

Typically, since noise is multiplied with the received signals in the radio transmission path, an error is included in the phase component of the vector sum of those received signals. In a well-known equal-gain combining method, the vectors (r1, θ1), (r2, θ2) of the received signals are combined. In a well-known maximal-ratio combining method, the vectors of the received signals are combined with weighting the respective amplitude r1, r2 of the received signals according to the respective amplitude r1, r2. In this method, the error of the phase component caused by the noise may be reduced by the weighting. In the above-described conventional scheme shown in FIG. 1, the respective amplitude of the received signals are weighted by their amplitude themselves as in the squaring the amplitude r1, r2. Therefore, the error of the phase component in the above-described diversity scheme may be reduced as compared to the equal-gain combining method, and may be equal to that of the maximal-ratio combining method.

When a digital modulating method such as a FSK and PSK, or an analog angular modulating method is applied to the radio transmission system, the transmission information is given by the phase component which is obtained in the above-mentioned sequence. Therefore, in FIG. 1, the signal decision circuit 115 discriminates the phase component of the vector sum of the received signals and produces a demodulated signal.

In the conventional diversity receiver shown in FIG. 1, the DSP 114 repeats the above-mentioned procedure, and, thus, the diversity reception based on the maximal-ratio combining method is realized. Therefore, the degradation of the transmission quality due to the fluctuation of the transmission characteristics in the radio transmission path may be reduced.

However, there is the following problem in the above-mentioned conventional diversity receiver shown in FIG. 1. In the conventional diversity receiver shown in FIG. 1, since an envelope component of the received signal in each branch varies at random, it is impossible to predict the amplitude component of the received signal. Therefore, the DSP 114 needs to successively carry out the above-mentioned calculating procedure for the received signal. For that successive calculating procedure, a large amount of processing is required.

Further, in the mobile radio communication system, a dynamic range of the received signal extends widely, and sometimes reaches to, for example, 90 dB. Therefore, when a DSP having a relatively short word length is used, processing with a high precision may not be achieved. Accordingly, responding performance is degraded and an error due to omission of a part of bits easily occurs in the calculating procedure. To use a DSP having a relatively long word length to resolve the above problem due to the short word length, causes cost and size of the receiver to increase.

In the prior art, for a large dynamic range of the received signal, another method is carried out instead of adjusting the DSP characteristics and the processing precision. In the method, an upper limit and a lower limit are set in the instant envelope component of the received signal of each branch, and the instant envelope component in the outside of a range between the upper limit and the lower limit is not taken into account for the processing. Therefore, the degradation of the transmission quality is unavoidable.

Further, in respective maximal-ratio combining method and equal-gain combining method, there are two type of combining methods, a postdetection type and a predetection type. In the postdetection type, after the received signals are detected in the demodulator, the detected signals are combined. In the predetection type, before the received signals are detected in the demodulator, phases of the received signals are adjusted and the received signals are combined.

In the diversity receiver using the predetection-type combining method, as mentioned above, the received signals in the respective branches are combined after the respective phases are adjusted to each other. Therefore, in the mobile radio communication system in which extremely strong fading occurs by fast variation of the multipath, it takes a long time to adjust the phases, so that sufficient responding performance required for a TDMA system having a predetermined time sequence may not be obtained.

Further, in the predetection-type combining method, phase shifters and variable gain amplifiers corresponding to the respective branches are required. This requirements cause a hardware scale and cost of the receiver to increase. Therefore, such a receiver may not be applied to mobile station equipment which needs to be miniaturized and lightened. Furthermore, since the phases of both branches' received signals are forcibly adjusted, it is difficult to use each received signal itself to regenerate the phase information and to further use antenna-switching diversity, etc., in addition to the predetection-type method.

SUMMARY OF THE INVENTION

It is an object of the present invention to provide a diversity receiver. The size of the receiver can be miniaturized and the cost of the receiver can be reduced without degradation of the diversity effect. This permits the disadvantages described above to be eliminated.

The object described above is achieved by a diversity receiver respectively receiving signals in two branches, the diversity receiver comprising: two demodulating sections for producing respective amplitude and phases of received signals at a symbol unit; a memory access section for providing an amplitude ratio corresponding to the amplitude of the received signals and a phase difference between the phases of the received signals; a storage section for storing at least one relative phase difference between a phase of a vector-combined signal, which was based on the received signals and one of the phases of the received signals at an address designated by the amplitude ratio and the phase difference of the received signals, the phase of the vector-combined signal being previously calculated based on the amplitude ratio, the phase difference, and the one of the phases of the received signals; and an adding section for adding the relative phase difference produced from the storage section being addressed by the amplitude ratio and the phase difference produced from the memory access section to the one of the phases of the received signals to produce the phase of the vector-combined signal combined based on the received signals.

According to the above-mentioned diversity receiver, degradation of the transmission performance due to noise occurring in each branch may be reduced by the vector-combining of the received signals. Further, in the diversity process, the relative phase difference may be obtained by only accessing the storage section with the amplitude ratio and the phase difference of the received signals without the calculating process. The phase of the vector-combined signal may be obtained by only the addition of the relative phase difference and the one of the phases of the received signals. Therefore, the circuit configuration of the diversity circuit may be simplified.

The object described above is also achieved by a diversity receiver respectively receiving signals in two branches, the diversity receiver comprising: two demodulating sections for producing respective amplitude and phases of received signals at a symbol unit; a memory access section for producing an amplitude ratio of the amplitude of the received signals and a phase difference between the phases of the received signals; and a storage section for storing at least one phase of a vector-combined signal combined based on the received signals for an address given by the amplitude ratio and the phase difference and one of the phases of the received signals, the phase of the vector-combined signal being previously calculated based on the amplitude ratio, the phase difference, and the one of the phases of the received signals; wherein the phase of the vector-combined signal is produced from the storage section by providing to the storage section the amplitude ratio and the phase difference from the memory access section and the one of the phases of the received signals from the demodulating sections at the symbol unit.

According to the above-mentioned diversity receiver, since the amplitude of the received signals are respectively weighted and are vector-combined, the degradation of the transmission performance due to noise occurring in each branch may be reduced. Further, in the diversity process, the phase of the vector-combined signal may be obtained by only accessing the storage section without the calculating process. Therefore, the circuit configuration of the diversity circuit may be further simplified.

The object described above is also achieved by a diversity receiver respectively receiving signals in two branches, the diversity receiver comprising: two demodulating sections for producing respective amplitude and phases of received signals at a symbol unit; a memory access section for producing an amplitude ratio of the amplitude of the received signals and a phase difference between the phases of the received signals; a phase selecting section for selecting the phase of a larger amplitude one of the received signals; a storage section for storing at least one relative phase difference between a phase of a vector-combined signal combined based on the received signals and the phase of the larger amplitude one of the received signals for an address given by the amplitude ratio and the phase difference of the received signals, the phase of the vector-combined signal being previously calculated based on the amplitude ratio and the phase difference of the received signals and the phase of the larger amplitude one of the received signals; and an adding section for adding the relative phase difference produced from the storage section being accessed by the amplitude ratio and the phase difference produced from the memory access section to the phase selected in the phase selecting section to produce the phase of the vector-combined signal combined based on the received signals.

According to the above diversity receiver, the relative phase difference provided from the storage section to the adding section is given as a relative value to the phase of the received signal which is selected by the phase selecting section. The relative phase difference to the phase of the larger amplitude one of the received signals may be smaller than that to the phase of the smaller amplitude one of the received signals. Therefore, an absolute value of the relative phase difference produced from the storage section may be smaller. Accordingly, an input data size and an output data size of the adding section may be reduced, and, thus, a hardware size of the receiver may also be miniaturized. Further, even if the transmission characteristics of the radio transmission path are subjected to extreme fluctuations, the demodulated phase may be prevented from being fluctuated and error occurrence may also be suppressed.

The object described above is also achieved by a diversity receiver respectively receiving signals in two branches, the diversity receiver comprising: two demodulating sections for producing respective amplitude and phases of received signals at a symbol unit; a memory access section for producing an amplitude ratio of the amplitude of the received signals and a phase difference between the phases of the received signals; a phase selecting section for selecting a smaller one of the phases of the received signals; a storage section for storing at least one relative phase difference between a phase of a vector-combined signal combined based on the received signals and the smaller one of the phases of the received signals for an address given by the amplitude ratio and the phase difference of the received signals, the phase of the vector-combined signal being previously calculated based on the amplitude ratio and the phase difference of the received signals and the smaller one of the phases of the received signals; and an adding section for adding the relative phase difference produced from the storage section being accessed by the amplitude ratio and the phase difference produced from the memory access section to the smaller one of the phases of the received signals selected in the phase selecting section to produce the phase of the vector-combined signal combined based on the received signals.

According to the above diversity receiver, the relative phase difference provided from the storage section to the adding section is given as a relative value to the smaller one of the phases of the received signals which is selected by the phase selecting section. The phase of the vector-combined signal is positively presented between the phases of the received signals. Therefore, the relative phase difference have a positive value. Accordingly, since one of inputs of the adding section is the positive value, the hardware size of the receiver may be miniaturized and the processing may be simplified.

The object described above is also achieved by a diversity receiver respectively receiving signals in two branches, the diversity receiver comprising: two demodulating sections for producing respective amplitude and phases of received signals at a symbol unit; a memory access section for producing an amplitude ratio of the amplitude of the received signals and a phase difference between the phases of the received signals; a phase selecting section for selecting the phase of a larger amplitude one of the received signals; and a storage section for storing at least one phase of a vector-combined signal combined based on the received signals for an address given by the amplitude ratio and the phase difference of the received signals and the phase of the larger amplitude one of the received signals, the phase of the vector-combined signal being previously calculated based on the amplitude ratio and the phase difference of the received signals and the phase of the larger amplitude one of the received signals; wherein the phase of the vector-combined signal is produced from the storage section by providing to the storage section the amplitude ratio and the phase difference from the memory access section and the phase selected in the phase selecting section at the symbol unit.

According to the above-mentioned diversity receiver, since the amplitude of the received signals are respectively weighted and are vector-combined, the degradation of the transmission performance due to noise occurring in each branch may be reduced. Further, in the diversity process, the phase of the vector-combined signal may be obtained by only accessing the storage section without the calculating process. Therefore, the circuit configuration of the diversity circuit may be further simplified.

The object described above is also achieved by a diversity receiver respectively receiving signals in two branches, the diversity receiver comprising: two demodulating sections for producing respective amplitude and phases of received signals at a symbol unit; a memory access section for producing an amplitude ratio of the amplitude of the received signals and a phase difference between the phases of the received signals; a phase selecting section for selecting a smaller one of the phases of the received signals; and a storage section for storing at least one phase of a vector-combined signal combined based on the received signals for an address given by the amplitude ratio and the phase difference of the received signals and the smaller one of the phases of the received signals, the phase of the vector-combined signal being previously calculated based on the amplitude ratio and the phase difference of the received signals and the smaller one of the phases of the received signals; wherein the phase of the vector-combined signal is produced from the storage section by providing to the storage section the amplitude ratio and the phase difference from the memory access section and the smaller one of the phases of the received signals selected in the phase selecting section at the symbol unit.

According to the above-mentioned diversity receiver, since the amplitude of the received signals is respectively weighted and are vector-combined, the degradation of the transmission performance due to noise occurring in each branch may be reduced. Further, in the diversity process, the phase of the vector-combined signal may be obtained by only accessing the storage section without the calculating process. Therefore, the circuit configuration of the diversity circuit may be further simplified.

The object described above is also achieved by one the diversity receivers mentioned above, wherein the vector-combined signal is a signal generated by combining the received signals with squaring the respective amplitude of the received signals.

According to the above diversity receiver, the phase of the vector-combined signal thus produced is given close to the phase of the larger amplitude one of the received signals as compared to the case where the respective amplitude of the received signals are not weighted. Therefore, the phase of the vector-combined signal may be obtained with a high signal to noise ratio in the same case where the maximal-ratio combining diversity is applied.

Other objects and further features of the present invention will be apparent from the following detailed description when read in conjunction with the accompanying drawings.

BRIEF DESCRIPTION OF THE DRAWINGS

FIG. 7 shows a table of a relation example between amplitude r1, r2, phases θ1, θ2, a phase $θ_{MRC}$ of a combined vector, and a phase difference D;

FIG. 11 shows a block diagram of a fourth embodiment of the diversity receiver according to the present invention.

DESCRIPTION OF THE PREFERRED EMBODIMENTS

First, descriptions will be given of principles of a diversity receiver according to the present invention, by referring to FIG. 2 to FIG. 4.

Figure 2:
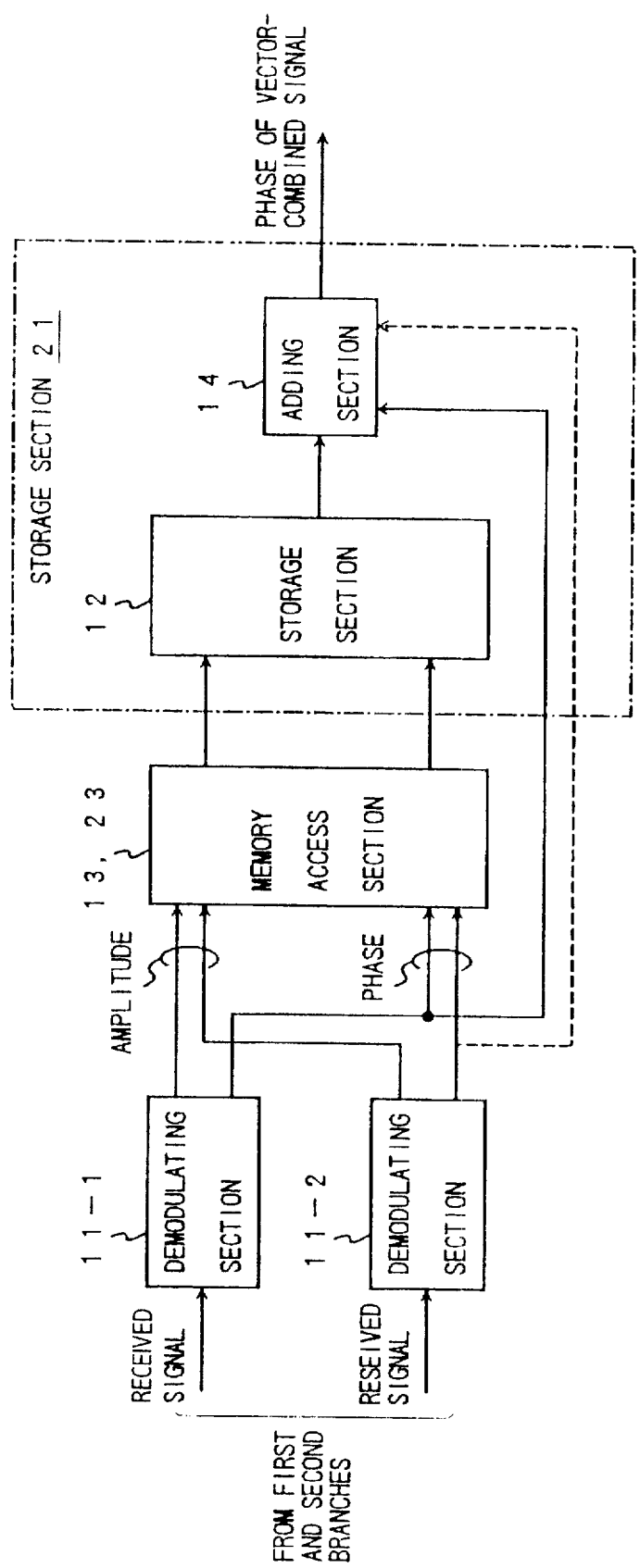
FIG. 2 shows a block diagram for explaining principles of a diversity receiver according to the present invention.

FIG. 2 shows a block diagram for explaining principles of the diversity receiver according to the present invention. The diversity receiver shown in FIG. 2 comprises two demodulating sections 11-1, 11-2, a storage section 12, a memory access section 13, and an adding section 14. In a radio transmission system, an angular modulation method is used.

In the following, a first principle of the diversity receiver according to the present invention will be discussed.

The two demodulating sections 11-1, 11-2 are respectively provided with received signals from two branches, and produces respective amplitude and phases of the received signals at a symbol unit defined by the modulation method. The memory access section 13 produces an amplitude ratio of the amplitude of the received signals and a phase difference between the phases of the received signals. The storage section 12 stores at least one relative phase difference between a phase of a vector-combined signal combined based on the received signals and one of the phases of the received signals for an address given by the amplitude ratio and the phase difference. The phase of the vector-combined signal is previously calculated based on the amplitude ratio, the phase difference, and the one of the phases of the received signals. The adding section 14 adds the relative phase difference produced from the storage section 12 to the one of the phases of the received signals to produce the phase of the vector-combined signal combined based on the received signals.

In the following, an operation of the diversity receiver shown in FIG. 2 will be discussed. In the modulation method used in the diversity receiver, a phase of a carrier changes at a unit of the symbol. Therefore, the phase of the vector-combined signal combined based on the received signals in the two branches indicates transmission information.

The phase of the vector-combined signal is obtained based on a relative phase difference between the phase of the vector-combined signal and the one of the phases of the received signals. The relative phase difference can be obtained by only the amplitude ratio and the phase difference of the received signals. Therefore, when the amplitude ratio and the phase difference of the received signals are produced, the phase difference is obtained. The phase of the vector-combined signal may be obtained by adding the one of the phases of the received signals to the relative phase difference.

In further detail, the storage section 12 stores the relative phase differences previously calculated for all combinations of the amplitude ratio and the phase difference of the received signals. In the calculation of the relative phase differences, the amplitude of the received signal may be respectively weighted by given values, for example, by their amplitude. The memory access section 13 produces the amplitude ratio and the phase difference of the received signals based on the amplitude and the phases produced from the demodulating sections 11-1, 11-2. The memory access section 13 accesses the storage section 12 by the address of the amplitude ratio and the phase difference of the received signals. By the accessing from the memory access section 13, the storage section 12 produces the relative phase difference for the amplitude ratio and the phase difference of the received signals. The adding section 14 adds one of the phases of the received signals to the relative phase difference, so that the phase of the vector-combined signal of the respectively-weighted received signals may be obtained.

In the above-mentioned diversity process, degradation of the transmission performance due to noise occurring in each branch may be reduced by the vector-combining of the received signals. Further, in the diversity process, the relative phase difference may be obtained by only accessing the storage section 12 with the amplitude ratio and the phase difference of the received signals without the calculating process. The phase of the vector-combined signal may be obtained by only the addition of the relative phase difference and the one of the phases of the received signals. Therefore, the circuit configuration of the diversity circuit may be simplified.

In the following, a second principle of the diversity receiver according to the present invention will be discussed by referring to FIG. 2.

In the second principle, a storage section 21 is provided instead of the storage section 12 and the adding section 14. In the storage section 21, the phases of the vector-combined signal combined based on the received signals are stored for all combinations of the amplitude ratio and the phase difference of the received signals, and the one of the phases of the received signals. A memory access section 23 produces the amplitude ratio and the phase difference of the received signals based on the amplitude and the phases produced from the demodulating sections 11-1, 11-2. And, the memory access section 23 accesses the storage section 21 by the address of the amplitude ratio and the phase difference of the received signals, and the one of the phases of the received signals. By accessing the memory access section 23, the storage section 21 directly produces the phase of the vector-combined signal of the respectively-weighted received signals.

In the above-mentioned diversity process, since the amplitude of the received signals are respectively weighted and are vector-combined, the degradation of the transmission performance due to noise occurring in each branch may be reduced. Further, in the diversity process, the phase of the vector-combined signal may be obtained by only accessing the storage section 21 without the calculating process. Therefore, the circuit configuration of the diversity circuit may be further simplified.

Figure 3:
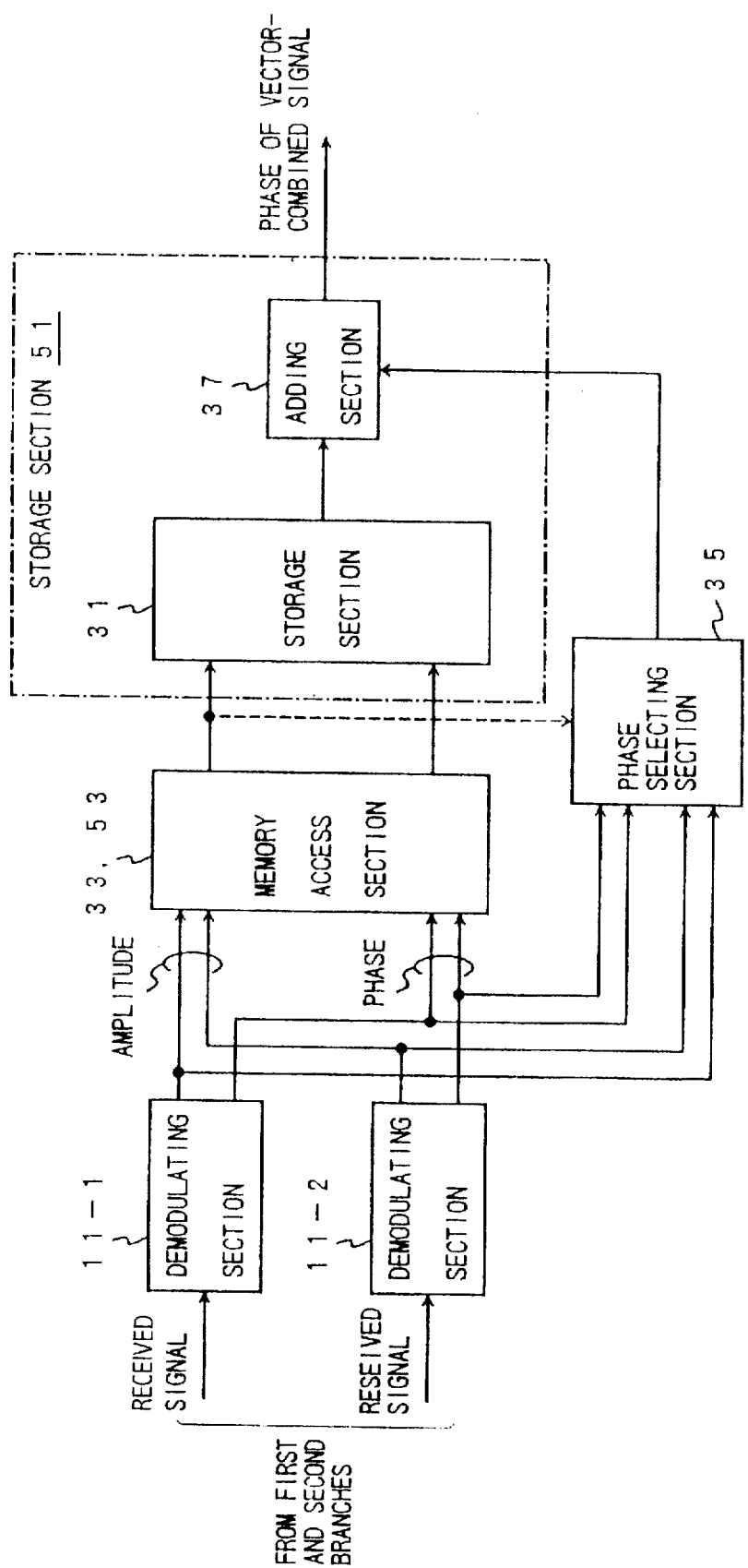
FIG. 3 shows a block diagram for explaining other principles of the diversity receiver according to the present invention.

FIG. 3 shows a block diagram for explaining other principles of the diversity receiver according to the present invention.

In the following, a third principle of the diversity receiver according to the present invention will be discussed by referring to FIG. 3.

To an adding section 37 provided instead of the adding section 14, the phase of a larger amplitude one of the received signals is provided by a phase selecting section 35. In a storage section 31 instead of the storage section 12, the relative phase differences between the vector-combined signal combined based on the received signals and the phase of the larger amplitude one of the received signals are stored for all combinations of the amplitude ratio and the phase difference of the received signals.

A memory access section 33 produces the amplitude ratio and the phase difference of the received signals based on the amplitude and the phases produced from the demodulating sections 11-1, 11-2. The memory access section 33 accesses the storage section 31 by the address of the amplitude ratio and the phase difference of the received signals. In the same way as the first principle shown in FIG. 2, the phase of the vector-combined signal may be obtained without the complex calculating process, and further, the same diversity effect may be obtained.

In the above diversity process, the relative phase difference provided from the storage section 31 to the adding section 37 is given as a relative value to the phase of the received signal which is selected by the phase selecting section 35. The relative phase difference to the phase of the larger amplitude one of the received signals may be smaller than that to the phase of the smaller amplitude one of the received signals. Therefore, an absolute value of the relative phase difference produced from the storage section 31 may be smaller as compared to that produced from the storage section 12 shown in FIG. 2.

Accordingly, an input data size and an output data size of the adding section 37 may be reduced, and, thus, a hardware size of the receiver may also be miniaturized. Further, even if the transmission characteristics of the radio transmission path are subjected to extreme fluctuations, the demodulated phase may be prevented from being fluctuated and error occurrence may also be suppressed.

Figure 4:
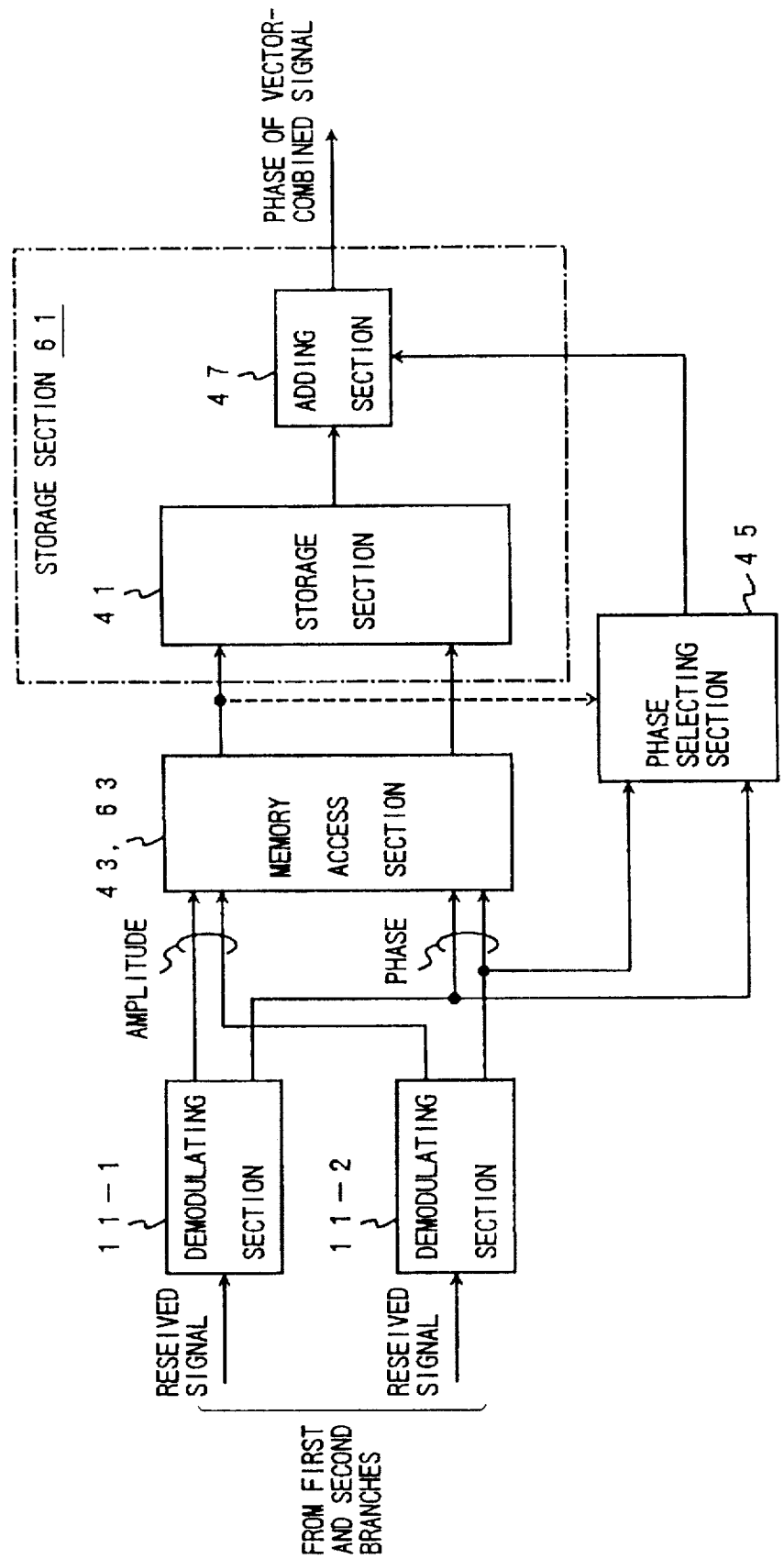
FIG. 4 shows a block diagram for explaining still other principles of the diversity receiver according to the present invention.

FIG. 4 shows a block diagram for explaining still other principles of the diversity receiver according to the present invention.

In the following, a fourth principle of the diversity receiver according to the present invention will be discussed by referring to FIG. 4.

To an adding section 47 provided instead of the adding section 14, a smaller one of the phases of the received signals is selected and provided by a phase selecting section 45. In a storage section 41 instead of the storage section 12, the relative phase differences between the vector-combined signal combined based on the received signals and the smaller one of the phases of the received signals are stored for all combinations of the amplitude ratio and the phase difference of the received signals.

A memory access section 43 produces the amplitude ratio and the phase difference of the received signals based on the amplitude and the phases produced from the demodulating sections 11-1, 11-2. The memory access section 43 accesses the storage section 41 with the address given by the amplitude ratio and the phase difference of the received signals. In the same way as the first principle shown in FIG. 2, the phase of the vector-combined signal may be obtained without the complex calculating process, and further, the same diversity effect may be obtained.

In the above diversity process, the relative phase difference provided from the storage section 41 to the adding section 47 is given as a relative value to the smaller one of the phases of the received signals which is selected by the phase selecting section 45. The phase of the vector-combined signal is positively presented between the phases of the received signals. Therefore, the relative phase difference have a positive value.

Accordingly, since one of inputs of the adding section 47 is the positive value, the hardware size of the receiver may be miniaturized and the processing may be simplified.

In the following, a fifth principle of the diversity receiver according to the present invention will be discussed by referring to FIG. 3.

In the fifth principle, a storage section 51 is provided instead of the storage section 31 and the adding section 37 in comparison with the third principle. In the storage section 51, the phases of the vector-combined signal combined based on the received signals are previously stored for all combinations of the amplitude ratio and the phase difference of the received signals and the phase which is selected by the phase selecting section 35. A memory access section 53 produces the amplitude ratio and the phase difference of the received signals based on the amplitude and the phases produced from the demodulating sections 11-1, 11-2. The memory access section 53 accesses the storage section 51 with the address given by the amplitude ratio and the phase difference of the received signals and the phase which is selected by the phase selecting section 35. In the same way as the second principle shown in FIG. 2, the phase of the vector-combined signal may be obtained without the complex calculating process, and further, the same diversity effect may be obtained.

In the above-mentioned diversity process, since the amplitude of the received signals are respectively weighted and are vector-combined, the degradation of the transmission performance due to noise occurring in each branch may be reduced. Further, in the diversity process, the phase of the vector-combined signal may be obtained by only accessing the storage section 51 without the calculating process. Therefore, the circuit configuration of the diversity circuit may be further simplified.

In the following, a sixth principle of the diversity receiver according to the present invention will be discussed by referring to FIG. 4.

In the sixth principle, a storage section 61 is provided instead of the storage section 41 and the adding section 47 in comparison with the fourth principle. In the storage section 61, the phases of the vector-combined signal combined based on the received signals are previously stored for all combinations of the amplitude ratio and the phase difference of the received signals and the phase which is selected by the phase selecting section 45. A memory access section 63 produces the amplitude ratio and the phase difference of the received signals based on the amplitude and the phases produced from the demodulating sections 11-1, 11-2. The memory access section 63 accesses the storage section 61 with the address given by the amplitude ratio and the phase difference of the received signals and the phase which is selected by the phase selecting section 45. In the same way as the second principle shown in FIG. 2, the phase of the vector-combined signal may be obtained without the complex calculating process, and further, the same diversity effect may be obtained.

In the above-mentioned diversity process, since the amplitude of the received signals are respectively weighted and are vector-combined, the degradation of the transmission performance due to noise occurring in each branch may be reduced. Further, in the diversity process, the phase of the vector-combined signal may be obtained by only accessing the storage section 61 without the calculating process. Therefore, the circuit configuration of the diversity circuit may be further simplified.

In the following, a seventh principle of the diversity receiver according to the present invention will be discussed.

In the above-mentioned first through sixth principles, when the relative phase difference and the phase of the vector-combined signal are previously calculated to be stored in the memory, the amplitude of the received signals are respectively weighted by the given value. In the seventh principle, in that case, the amplitude of the received signals are respectively weighted by their amplitude values. Namely, the amplitude of the received signals are respectively squared and are vector-combined.

In the above diversity process, the phase of the vector-combined signal thus produced is given close to the phase of the larger amplitude one of the received signals as compared to the case where the respective amplitude of the received signals are not weighted. Therefore, the phase of the vector-combined signal may be obtained with a high signal to noise ratio in the same case where the maximal-ratio combining diversity is applied.

Next, descriptions will be given of embodiments of the diversity receiver according to the present invention, by referring to FIG. 5 to FIG. 10.

Figure 1:
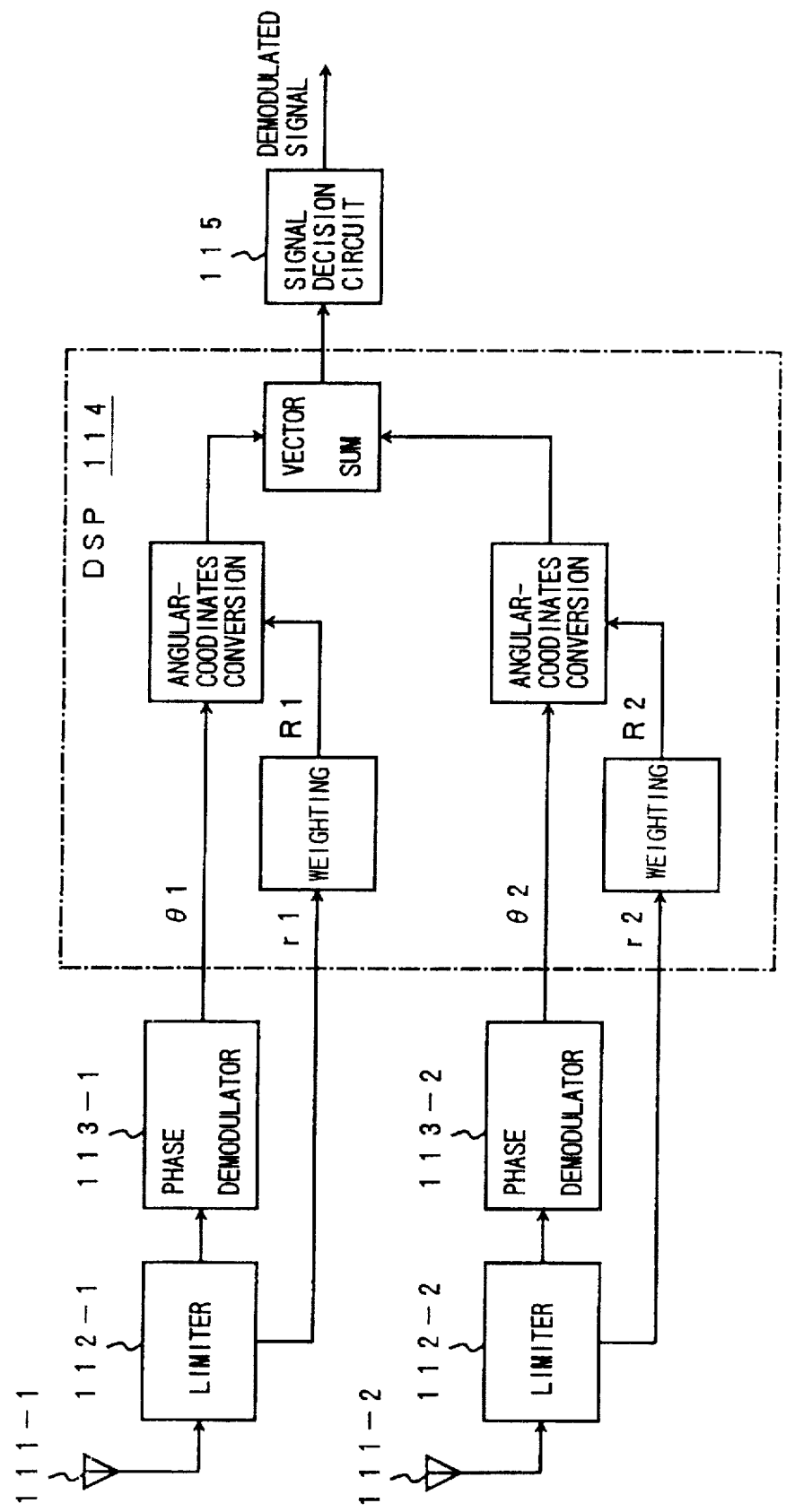
FIG. 1 shows a block diagram of a configuration example of a conventional diversity receiver.
Figure 5:
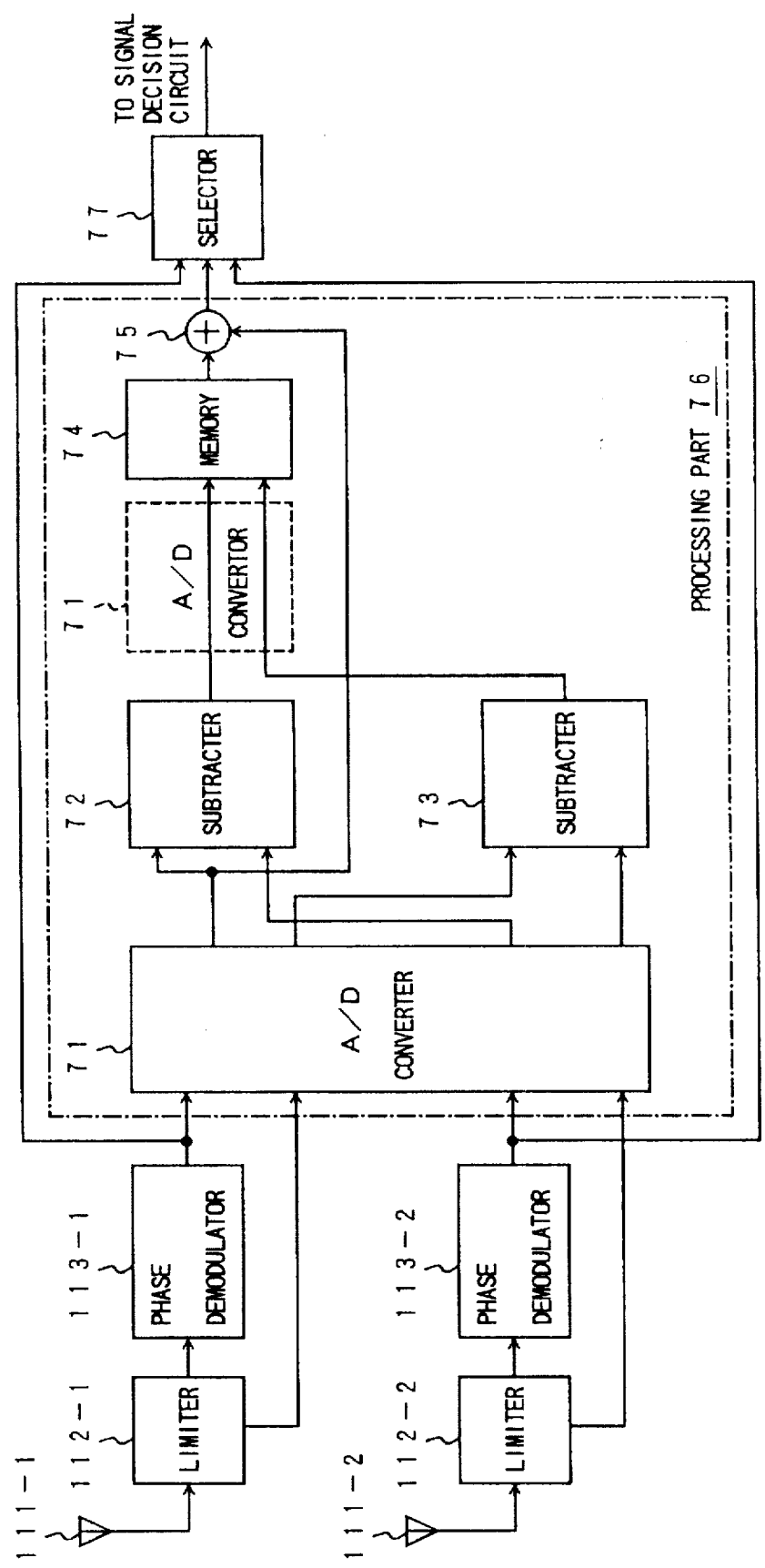
FIG. 5 shows a block diagram of a first embodiment of the diversity receiver according to the present invention.

FIG. 5 shows a block diagram of a first embodiment of the diversity receiver according to the present invention. Elements in FIG. 5 which are the same as those of FIG. 1 are given the same reference numerals. In the diversity receiver shown in FIG. 5, instead of the DSP 114 shown in FIG. 1, a processing part 76 including an analog-to-digital (A/D) converter 71, subtracters 72, 73, a memory 74, and an adder 75 (which is represented by a block shown in a one-dotted chain line) is provided. A selector 77 is provided in a front stage of the signal decision circuit 115 (not shown).

In the processing part 76, first to fourth inputs of the A/D converter 71 are provided with the output of the phase demodulator 113-1, the second output of the limiter 112-1, the output of the phase demodulator 113-2, and the second output of the limiter 112-2. A first output of the A/D converter 71 is provided to one input of the subtracter 72 and one input of the adder 75. A third output of the A/D converter 71 related to the output of the phase demodulator 113-2 is provided to the other input of the subtracter 72. Second and fourth inputs of the A/D converter 71 related to the outputs of the limiters 112-1, 112-2 are respectively provided to two inputs of the subtracter 73. An output of the subtracter 72 is connected to a given part of an address input of the memory 74. An output of the subtracter 73 is connected to the residual part of the address input of the memory 74. An output of the memory 74 is provided to the other input of the adder 75, and an output of the adder 75 is provided to a first input of the selector 77.

A second input of the selector is provided with the output of the phase demodulator 113-1, and a third input thereof is provided with the output of the phase demodulator 113-2.

In comparison with FIG. 2, a set of the limiter 112-1 and the phase demodulator 113-1 corresponds to the demodulating section 11-1, a set of the limiter 112-2 and the phase demodulator 113-2 corresponds to the demodulating section 11-2, the memory 74 corresponds to the storage section 12, a set of the A/D converter 71 and the subtracters 72, 73 corresponds to the memory access section 13, and the adder 75 corresponds to the adding section 14.

Figure 6:
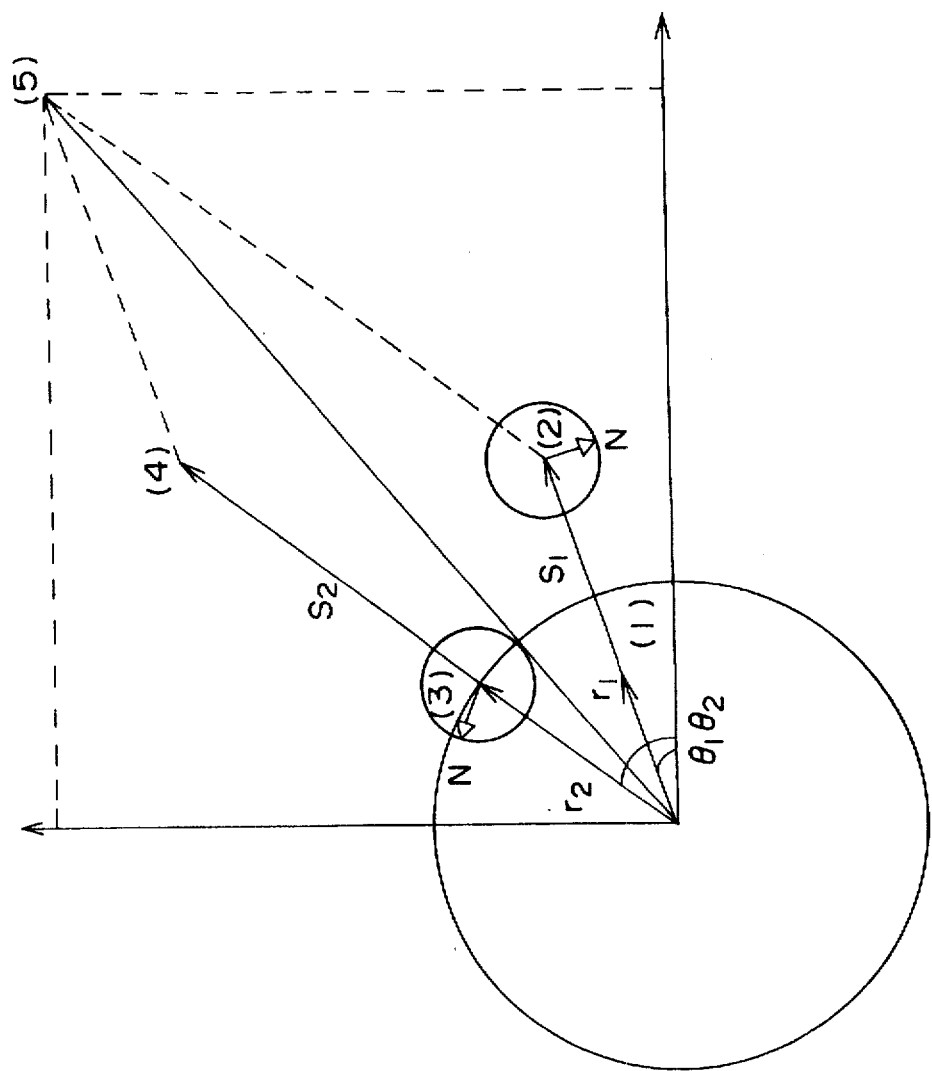
FIG. 6 shows an illustration for explaining an operation of the first embodiment of the diversity receiver according to the present invention shown in FIG. 5.

In the following, an operation of the diversity receiver shown in FIG. 5 will be discussed. FIG. 6 shows an illustration for explaining the operation of the first embodiment of the diversity receiver according to the present invention shown in FIG. 5.

The A\D converter 71 receives the first phase signal and the second phase signal from the phase demodulators 113-1, 113-2 with the first amplitude signal and the second amplitude signal from the limiters 112-1, 112-2, and converts successively these signals to digital signals. In the following descriptions, the digitally-converted first phase signal and second phase signal are respectively referred to as $\theta1$, $\theta2$, and the digitally-converted first amplitude signal and second amplitude signal are respectively referred to as $r1$, $r2$.

In FIG. 6, a vector S1 (shown in (2)) is generated by squaring the first amplitude r1 of the received signal (shown in (1)) in the first branch, and a vector S2 (shown in (4)) is generated by squaring the second amplitude of the received signal (shown in (3)) in the second branch. The vector S1 and the vector S2 are combined to produce a combined vector (shown in (5)). In a phase of the combined vector, an error caused by a noise vector N which is multiplied in the radio transmission path may be extremely reduced as compared to the conventional diversity using an equal-gain combining method, but is substantially equal to the diversity using a maximal-ratio combining (MRC) method.

The phase $\theta_{MRC}$ of the combined vector is given by the following equation.

$$\theta_{MRC} = \tan^{-1}\ [(r1^2 \cdot \sin\ \theta1 + r2^2 \cdot \sin\ \theta2)/(r1^2 \cdot \cos\ \theta1 + r2^2 \cdot \cos\ \theta2)] \quad (1)$$

When an amplitude ratio $\delta r$ of the amplitude r2 of the received signal in the second branch to the amplitude r1 of the received signal of the first branch and a phase difference $\delta\theta$ between the phases $\theta1$, $\theta2$ of the received signals in both branches are represented by the following equations, $$r2 = r1 \cdot \delta r \quad (2)$$

$$\theta2 = \theta1 + \delta\theta, \quad (3)$$

the equation (1) is rearranged as follows:

$$\theta_{MRC} = \tan^{-1}[(r1^2 \cdot \sin\ \theta1 + (r1 \cdot \delta r)^2 \cdot \quad (4)$$

$$\sin(\theta1 + \delta\theta))/(r1^2 \cdot \cos\ \theta1 + (r1 \cdot \delta r)^2 \cdot \cos(\theta1 + \delta\theta))]$$

As shown in the equation (4), the phase of the combined vector may be represented excluding the amplitude r2 and the phase $\theta2$ of the received signal in the second branch. Namely, the phase of the combined vector may be represented with one of two branches. When the phase difference $\delta\theta$ is zero, the phase $\theta_{MRC}$ of the combined vector is $\theta1$, which is referred to as a reference phase, hereinafter.

In FIG. 5, when the square of the amplitude ratio $\delta r^2$ ($=(r2^2/r1^2)$) and the phase difference $\delta\theta$ ($=(\theta2-\theta1)$) are determined, only one relative phase difference D between the phase $\theta_{MRC}$ of the combined vector and the reference phase $\theta1$ can be obtained regardless of the amplitude r1, r2 and the phases θ1, θ2 of the received signals by characteristics of a homologous triangle constructed with the amplitude r1², r2² and the included angle δθ. In this case, the relative phase difference D is easily obtained as follows:

$$D=\tan^{-1}[\delta r^2 \cdot \sin \delta\theta/(1+\delta r^2 \cdot \cos \delta\theta)] \quad (5)$$

FIG. 7 shows a table of a relation example between the amplitude r1, r2, the phases θ1, θ2, the phase $\theta_{MRC}$ of the combined vector, and the relative phase difference D. FIG. 7 shows a case where the amplitude ratio δr is 4 dB and the phase difference δθ is 56.25°. In FIG. 7, to simplify the description, the phases θ1, θ2 are fixed. As shown in FIG. 7, when the amplitude ratio δr and the phase difference δθ are determined at 4 dB, 56.25°, only one relative phase difference D may be obtained. And, by adding the relative phase difference D to the reference phase θ1, the phase $\theta_{MRC}$ of the combined vector is obtained as follows:

$$\theta_{MRC}=D+\theta 1, \quad (6)$$

where the phase θ1 is the reference phase in the above-mentioned example. In another case, the reference phase may be the phase θ2.

Figure 8:
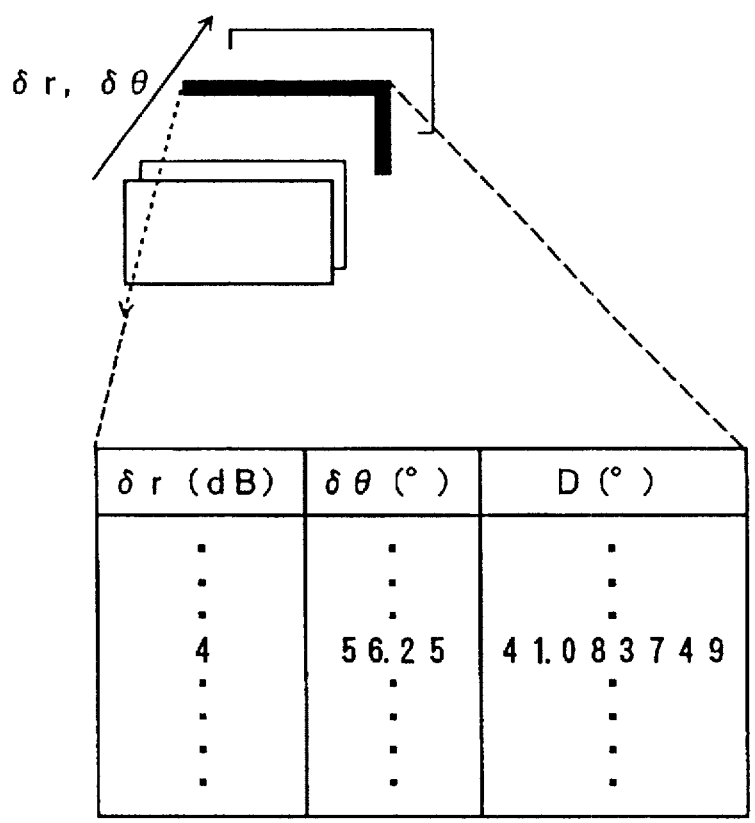
FIG. 8 shows an example of a table stored in a memory shown in FIG. 5.

FIG. 8 shows an example of a table stored in the memory 74 shown in FIG. 5. In the table, the phase differences D between the phase $\theta_{MRC}$ of the combined vector and the reference phase θ1 are stored for all combinations of the amplitude ratio δr and the phase difference δθ which are used as the addresses. In the table, the amplitude ratio is represented by a unit of dB.

Returning to FIG. 5, in the subtracter 72, the first and second phase signals θ1, θ2 are provided from the A/D converter 71, and the phase difference δθ represented by the equation (3) is calculated every symbols. In the subtracter 73, the first and second amplitude signals r1, r2 are provided from the A/D converter 71, and the amplitude ratio δr represented by the equation (2) is calculated for every symbol. In general, the outputs of the limiter 112-1, 112-2 are related to representations at logarithms (for example, dB). Therefore, the amplitude ratio δr can be obtained by the subtraction of logarithms (dB).

In the memory 74, the phase difference δθ and the amplitude ratio δr are provided to the address input of the memory 74, and the relative phase difference D corresponding to the phase difference δθ and the amplitude ratio δr is produced.

In the adder 75, the reference phase θ1 is added to the relative phase difference D produced from the memory 74, whereby the phase $\theta_{MRC}$ of the combined vector of the received signals in both branches is obtained. The phase $\theta_{MRC}$ of the combined vector is transmitted to the signal decision circuit through the selector 77.

When the phases θ1, θ2 of the received signals in both branches are further provided to the selector 77 from the phase demodulators 113-1, 113-2 in addition to the phase $\theta_{MRC}$ of the combined vector, the selector 77 selects and transmits to the signal decision circuit one of the three phases θ1, θ2, $\theta_{MRC}$ according to a selection signal (not shown). In this way, by the selector 77, a hybrid diversity system of the postdetection selection diversity and the maximal-ratio combining diversity may be realized. Therefore, according to an environmental condition, a proper phase may be selected.

According to the first embodiment, the phase $\theta_{MRC}$ of the combined vector which is obtained by combining the received signals based on the maximal-ratio combining method is obtained by adding the phase of one of the received signals to the relative phase difference D determined by the amplitude ratio δr and the phase difference δθ of the received signals in both branches. In the diversity receiver according to present invention, the subtracters 73, 72 obtaining the amplitude ratio δr and the phase difference δθ of the received signals in the branches, and the memory 74 storing calculation results of the relative phase difference D for the all combinations of amplitude ratio δr and the phase difference δθ as the addresses are provided. Therefore, the hardware scheme of the diversity receiver may be simplified without the degradation of the diversity effect. When a DSP operating the same functions as that of this hardware is provided, the processing amounts in the DSP may be extremely reduced.

Figure 9:
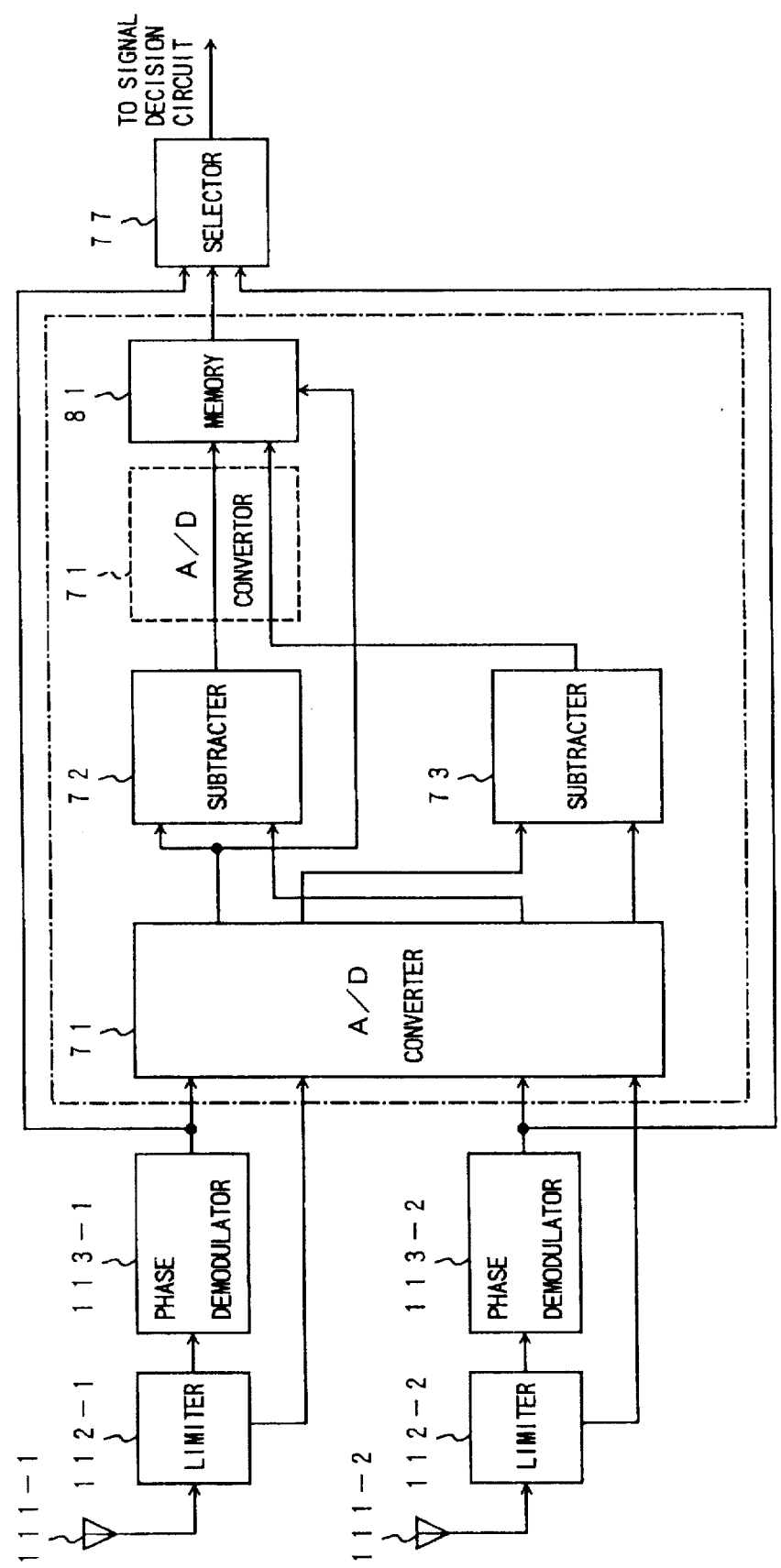
FIG. 9 shows a block diagram of a second embodiment of the diversity receiver according to the present invention.

FIG. 9 shows a block diagram of a second embodiment of the diversity receiver according to the present invention. Elements in FIG. 9 which are the same as those of FIG. 5 are given the same reference numerals. In the diversity receiver shown in FIG. 9, instead of the memory 74 and the adder 75 shown in FIG. 5, a memory 81 is provided.

In comparison with FIG. 2, a set of the limiter 112-1 and the phase demodulator 113-1 corresponds to the demodulating section 11-1, a set of the limiter 112-2 and the phase demodulator 113-2 corresponds to the demodulating section 11-2, the memory 81 corresponds to the storage section 21, and a set of the A/D converter 71 and the subtracters 72, 73 corresponds to the memory access section 23.

In the following, an operation of the diversity receiver shown in FIG. 9 will be discussed.

In the memory 81, the amplitude ratio δr from the subtracter 73, the phase difference δθ from the subtracter 72, and the first phase θ1 (or the second phase θ2) from the A/D converter 71 are provided to the address input of the memory 81. For all combinations of above three elements of the amplitude ratio δr, the phase difference δθ, and the first phase θ1 (or the second phase θ2), all values of the phase $\theta_{MRC}$ of the combined vector which are previously calculated by the equation (4) are stored.

In the second embodiment, when the amplitude ratio δr from the subtracter 73, the phase difference δθ from the subtracter 72, and the first phase θ1 (or the second phase θ2) are provided to the memory 81, the phase $\theta_{MRC}$ of the combined vector is directly produced to the selector 77 without the adding operation of the adder 75 shown in FIG. 5. Therefore, since the adder 75 is eliminated, response time in the diversity processing may be reduced by a time period required for the adding operation in the adder 75. Further, the number of elements constructing the hardware of the diversity receiver may also be reduced. This increases reliability of the diversity receiver.

Figure 10:
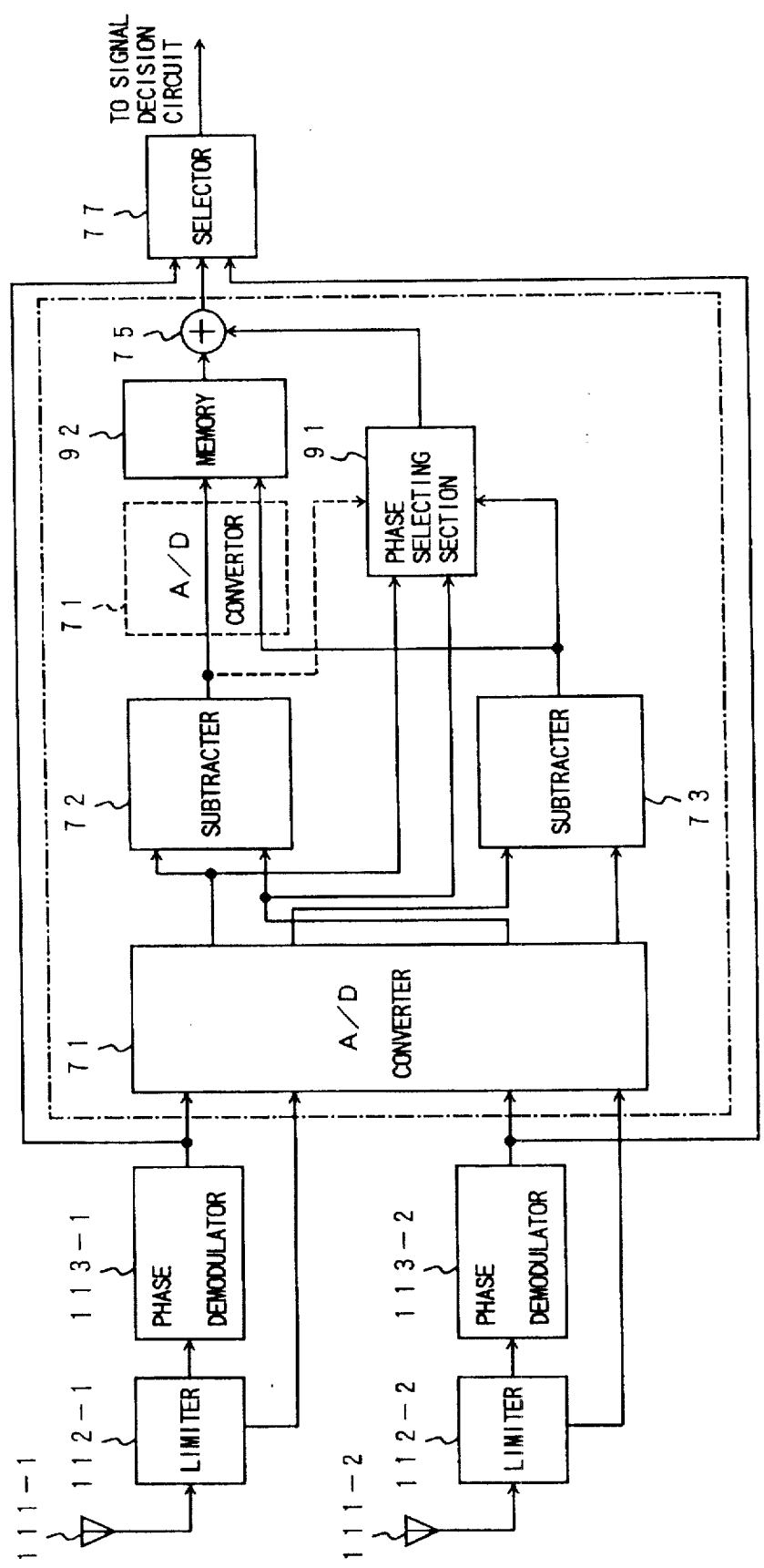
FIG. 10 shows a block diagram of a third embodiment of the diversity receiver according to the present invention.

FIG. 10 shows a block diagram of a third embodiment of the diversity receiver according to the present invention. Elements in FIG. 10 which are the same as those of FIG. 5 are given the same reference numerals. In the diversity receiver shown in FIG. 10, a phase selecting section 91 is provided. To the phase selecting section 91, the first phase θ1 and the second phase θ2 are provided. One of these phases is selected in the phase selecting section 91, and is provided to one input of the adder 75. To a selection input of the phase selecting section 91, the output of the subtracter 73 is provided. Further, instead of the memory 74, a memory 92 is provided.

In comparison with FIG. 3, a set of the limiter 112-1 and the phase demodulator 113-1 corresponds to the demodulating section 11-1, a set of the limiter 112-2 and the phase demodulator 113-2 corresponds to the demodulating section 11-2, the memory 92 corresponds to the storage section 31, a set of the A/D converter 71 and the subtracters 72, 73 corresponds to the memory access section 33, the phase selecting section 91 corresponds to the phase selection section 35, and the adder 75 corresponds to the adding section 37.

In the following, an operation of the diversity receiver shown in FIG. 10 will be discussed.

When the amplitude r2 of the received signal in the second branch is equal to or larger than the amplitude r1 of the received signal in the first branch, the amplitude ratio is equal to or larger than 1, and the output of the subtracter 73 is equal to or larger than 0. In this case, as shown in the equation (6), the relative phase difference D is given by the difference between the phase $\theta_{MRC}$ of the combined vector given by the equation (4) and the first phase $\theta 1$.

On the other hand, when the amplitude r2 of the received signal in the second branch is smaller than the amplitude r1 of the received signal in the first branch, the amplitude ratio is less than 1, and the output of the subtracter 73 is less than 0. In this case, the amplitude r2 is substituted to the amplitude r1 in the equation (4), and the phase $\theta_{MRC}'$ is given as follows:

$$\theta_{MRC}' = \tan^{-1}[(r2^2 \cdot \sin\theta 1 + (r2 \cdot \delta r)^2 \cdot \quad (7)$$
$$\sin(\theta 1 + \delta\theta))/(r2^2 \cdot \cos\theta 1 + (r2 \cdot \delta r)^2 \cdot \cos(\theta 1 + \delta\theta))]$$

The relative phase difference D is given by a difference between the phase $\theta_{MRC}'$ and the second phase $\theta 2$. In the memory 92, the absolute values of these relative phase difference D are stored according to the amplitude ratio $\delta r$ given by the subtracter 73 and the phase difference $\delta\theta$ given by the subtracter 72. The absolute value may be reduced to relatively small value.

In the phase selecting section 91, the selection is controlled by the output of the subtracter 73. When the following inequality is determined for the first amplitude r1 and the second amplitude r2, $$r1 \geq r2,$$

the first phase $\theta 1$ is selected and is provided to the adder 75. When the following inequality is determined, $$r1 < r2,$$

the second phase $\theta 2$ is selected and is provided to the adder 75.

Therefore, in the adder 75, the first phase $\theta 1$ or the second phase $\theta 2$ produced from the phase selecting section 91 is added to the relative phase difference D produced from the memory 92. In the same way as the first embodiment shown in FIG. 5, the phase $\theta_{MRC}$ of the combined vector may be obtained.

In the above-mentioned embodiment, the reference phase is determined according to the received signal having the larger amplitude. At that time, the absolute value of the relative phase difference D between the phase $\theta_{MRC}$ of the combined vector and the reference phase may be a smaller value as compared to the other case where the reference phase is set to the phase of a smaller amplitude one of the received signals. The smaller value of the relative phase difference D is provided to the adder 75 from the memory 92. Accordingly, input data size and output data size of the adder 75 may be reduced. Further, even if the amplitude and the phases of the received signals in the two branches extremely fluctuate, a large error may not be added to the demodulated signal produced from the adder 75.

In the following, a description will be given of another configuration and its operation in the third embodiment shown in FIG. 10. In this configuration, the selection input of the phase selecting section 91 is provided with the output of the subtracter 72 instead of the output of the subtracter 73 as shown in a dotted line in FIG. 10.

In comparison with FIG. 3, a set of the limiter 112-1 and the phase demodulator 113-1 corresponds to the demodulating section 11-1, a set of the limiter 112-2 and the phase demodulator 113-2 corresponds to the demodulating section 11-2, the memory 92 corresponds to the storage section 41, a set of the A/D converter 71 and the subtracters 72, 73 corresponds to the memory access section 43, the phase selecting section 91 corresponds to the phase selection section 45, and the adder 75 corresponds to the adding section 47.

The operation of the above-mentioned embodiment follows.

When the second phase $\theta 2$ of the received signal in the second branch is equal to or larger than the first phase $\theta 1$ of the received signal in the first branch, the phase difference $\delta\theta$, namely the output of the subtracter 72, is equal to or larger than 0. In this case, as shown in the equation (6), the relative phase difference D stored in the memory 92 is given by the difference between the phase $\theta_{MRC}$ of the combined vector given by the equation (4) and the first phase $\theta 1$.

On the other hand, when the second phase $\theta 2$ of the received signal in the second branch is smaller than the first phase $\theta 1$ of the received signal in the first branch, the phase difference $\delta\theta$, namely the output of the subtracter 73, is less than 0. In this case, the second phase $\theta 2$ is substituted to the first phase $\theta 1$ in the equation (4), and the phase $\theta_{MRC}'$ is given as follows:

$$\theta_{MRC}' = \tan^{-1}[(r1^2 \cdot \sin\theta 2 + (r1 \cdot \delta r)^2 \cdot \quad (8)$$
$$\sin(\theta 2 + \delta\theta))/(r1^2 \cdot \cos\theta 2 + (r1 \cdot \delta r)^2 \cdot \cos(\theta 2 + \delta\theta))]$$

The relative phase difference D is given by a difference between the phase $\theta_{MRC}'$ and the second phase $\theta 2$. In the memory 92, positive values of these relative phase differences D are stored according to the amplitude ratio $\delta r$ given by the subtracter 73 and the phase difference $\delta\theta$ given by the subtracter 72.

In the phase selecting section 91, the selecting operation is controlled by the output of the subtracter 72. A smaller one of the first phase $\theta 1$ and the second phase $\theta 2$ is selected and is provided to the adder 75.

Therefore, in the adder 75, the first phase $\theta 1$ or the second phase $\theta 2$ produced from the phase selecting section 91 is added to the relative phase difference D produced from the memory 92. In the same way as the first embodiment shown in FIG. 5, the phase $\theta_{MRC}$ of the combined vector may be obtained.

In the above-mentioned embodiment, input values to the adder 75 are the positive value of the relative phase difference D produced from the memory 92 and the smaller one of the first phase $\theta 1$ and the second phase $\theta 2$. Therefore, the processing of the adder 75 may be constructed with only the adding circuit. As a result, hardware of the receiver may be simplified.

FIG. 11 shows a block diagram of a fourth embodiment of the diversity receiver according to the present invention. Elements in FIG. 11 which are the same as those of FIG. 10 are given the same reference numerals. In the diversity receiver shown in FIG. 11, instead of the memory 92 and the adder 75 shown in FIG. 10, a memory 101 is provided.

In comparison with FIG. 3, a set of the limiter 112-1 and the phase demodulator 113-1 corresponds to the demodulating section 11-1, a set of the limiter 112-2 and the phase demodulator 113-2 corresponds to the demodulating section 11-2, the memory 101 corresponds to the storage section 51, a set of the A/D converter 71 and the subtracters 72, 73 corresponds to the memory access section 53, and the phase selecting section 91 corresponds to the phase selecting section 35.

In the following, an operation of the diversity receiver shown in FIG. 11 will be discussed.

In the memory 101, the amplitude ratio $\delta r$ from the subtracter 73, the phase difference $\delta\theta$ from the subtracter 72, and the first phase $\theta 1$ (or the second phase $\theta 2$) from the phase selecting section 91 are provided to the address input of the memory 101. And, for all combinations of above three elements of the amplitude ratio $\delta r$, the phase difference $\delta\theta$, and the first phase $\theta 1$ (or the second phase $\theta 2$), all values of the phase $\theta_{MRC}'$ of the combined vector which are previously calculated by the equations (4) and (7) are stored.

In the fourth embodiment, when the amplitude ratio $\delta r$ from the subtracter 73, the phase difference $\delta\theta$ from the subtracter 72, and the first phase $\theta 1$ (or the second phase $\theta 2$) are provided to the memory 101, the phase $\theta_{MRC}$, $\theta_{MRC}'$ of the combined vector is directly produced to the selector 77 without the adding operation of the adder 75 shown in FIG. 10. Therefore, since the adder 75 is eliminated, the response time in the diversity processing may be reduced by a time period required for the adding operation in the adder 75. Further, the number of elements constructing the hardware of the diversity receiver may also be reduced. This increases reliability of the diversity receiver.

In the following, a description will be given of second configuration and its operation in the fourth embodiment shown in FIG. 11. In this configuration, stored data in the memory 101 is different from that of previous-mentioned first configuration of the fourth embodiment.

In comparison with FIG. 3, a set of the limiter 112-1 and the phase demodulator 113-1 corresponds to the demodulating section 11-1, a set of the limiter 112-2 and the phase demodulator 113-2 corresponds to the demodulating section 11-2, the memory 101 corresponds to the storage section 61, a set of the A/D converter 71 and the subtracters 72, 73 corresponds to the memory access section 63, and the phase selecting section 91 corresponds to the phase selecting section 45.

In the memory 101, the amplitude ratio $\delta r$ from the subtracter 73, the phase difference $\delta\theta$ from the subtracter 72, and the first phase $\theta 1$ or the second phase $\theta 2$ from the phase selecting section 91 are provided to the address input of the memory 101. And, for all combinations of above three elements of the amplitude ratio $\delta r$, the phase difference $\delta\theta$, and one of the first phase $\theta 1$ and the second phase $\theta 2$, all values of the phase $\theta_{MRC}$, $\theta_{MRC}'$ of the combined vector which are previously calculated by the equations (4) and (8) are stored.

In this second configuration of the fourth embodiment, when the amplitude ratio $\delta r$ from the subtracter 73, the phase difference $\delta\theta$ from the subtracter 72, and the first phase $\theta 1$ (or the second phase $\theta 2$) are provided to the memory 101, the phase $\theta_{MRC}$, $\theta_{MRC}'$ of the combined vector is directly produced to the selector 77 without the adding operation of the adder 75 shown in FIG. 10. Therefore, since the adder 75 is eliminated, the response time in the diversity processing may be reduced by a time period required for the adding operation in the adder 75. Further, the number of elements constructing the hardware of the diversity receiver may also be reduced. This increases reliability of the diversity receiver.

In the above-mentioned embodiments, when the relative phase difference D and the phase $\theta_{MRC}$ of the combined vector are calculated to be stored in the memories 74, 81, 92, 101, as shown in the equations (4), (7), (8), the amplitude of the received signal is squared. Namely, for the maximal-ratio combining diversity, the amplitude of the received signal is weighted by itself. However, the present invention is also applicable to the equal-gain combining diversity. In this case, in the equations (4), (7), (8), the amplitude of the received signal is weighted by 1.

In this way, for a variety of combining methods, the relative phase difference D and the phase $\theta_{MRC}$ of the combined vector are may be calculated based on the amplitude ratio $\delta r$ and the phase difference $\delta\theta$. Therefore, when the relative phase differences D and the phases $\theta_{MRC}$ of the combined vector for a plurality of combining methods are stored in the memory, if the data for the plurality of combining methods is selected according to a condition of the radio transmission path, a hybrid diversity system may be realized and may obtain superior diversity effect.

In the above-mentioned embodiments, the data of the table stored in the memories 74, 81, 92, 101 is not shown in detail. However, if the relative phase difference D and the phase $\theta_{MRC}$ of the combined vector can be positively read out based on the amplitude ratio $\delta r$ and the phase difference $\delta\theta$ given as the address, the memory may have any configuration.

In the above-mentioned embodiments, the modulation method and the frequency band of the received signals are not specified. In the present invention, any modulation method, in which the frequency or the phase of the carrier is shifted according to the transmission information and all signal points in a signal space diagram have the same amplitude, is applicable regardless of a modulation system such as an analog modulation system and a digital modulation system. Further, when the present invention is applicable to the above modulation system, any frequency band is usable.

More specifically, the present invention is not limited to the digital modulation system in which the data of the transmission information is directly mapped to the phase in the signal space diagram. For example, the present invention is applicable to a differential-coding-type digital modulation system in which differential data between current data (slot data) and latest data (slot data) of the transmission information is mapped to the phase in the signal space diagram. In this case, the amplitude ratio $\delta r$ and the phase difference $\delta\theta$ are obtained as a whole average, a geometrical mean, or another average with the latest slot data, and the amplitude ratio may be obtained by successive interpolation.

Further, in the above-mentioned embodiments, since after the A/D converter 71, the subtracters 72, 73 and the adder 75 are provided, these circuits are constructed with the digital circuits and the subtracting and adding operations are carried out by digital signal processing. However, it is possible to locate the A/D converter 71 after the subtracters 72, 73 as shown in dotted-line block 71 of FIG. 5, and FIG. 9 to FIG. 11. It is also possible to provide a digital-to-analog converter between the memory and the adder 75. In these cases, the subtracters 72, 73 and the adder 75 are constructed with analog circuits (for example, operational amplifiers) and the subtracting and adding operations are carried out by analog signal processing.

In the above-mentioned embodiments, a space diversity is constructed with the two antennas 111-1, 111-2. In the present invention, any diversity such as a polarization diversity, a frequency diversity, an angular diversity, a time diversity is applicable if phase information of the combined vector can be written in the table form as the memories 74, 81, 92, 101.

Further, in the above-mentioned embodiments, the present invention is applied to the maximal-ratio combining diversity system and the equal-gain combining diversity system. However, the present invention is not limited to these two diversity systems. The present invention is applicable to any diversity system, if the phase information of the combined vector can be specifically determined by the amplitude ratio δr, the phase difference δθ of the received signals in both branches, and the phase of one of the received signal.

Further, the present invention is not limited to these embodiments, but other variations and modifications may be made without departing from the scope of the present invention.

What is claimed is:

1. A diversity receiver respectively receiving signals in at least two branches, the diversity receiver comprising:
   at least two demodulating means respectively provided for said at least two branches for producing respective amplitude and phases of received signals at a unit of symbol;
   memory access means for producing an amplitude ratio of said amplitude of the received signals and a phase difference between the phases of the received signals;
   storage means for storing at least one relative phase difference between a phase of a vector-combined signal combined based on the received signals and one of the phases of the received signals for an address given by said amplitude ratio and said phase difference of the received signals, said phase of the vector-combined signal being previously calculated based on said amplitude ratio, said phase difference, and said one of the phases of the received signals; and
   adding means for adding said relative phase difference produced from said storage means being addressed by said amplitude ratio and said phase difference produced from the memory access means to said one of the phases of the received signals to produce said phase of the vector-combined signal combined based on the received signals.

2. A diversity receiver respectively receiving signals in at least two branches, said diversity receiver comprising:
   at least two demodulating means respectively provided for said at least two branches for producing respective amplitude and phases of received signals at a unit of symbol;
   memory access means for producing an amplitude ratio of said amplitude of the received signals and a phase difference between the phases of the received signals; and
   storage means for storing at least one phase of a vector-combined signal combined based on the received signals for an address given by said amplitude ratio and said phase difference and one of the phases of the received signals, said phase of the vector-combined signal being previously calculated based on said amplitude ratio, said phase difference, and said one of the phases of the received signals;
   wherein said phase of the vector-combined signal is produced from said storage means by providing to the storage means said amplitude ratio and said phase difference from the memory access means and said one of the phases of the received signals from said demodulating means at the symbol unit.

3. A diversity receiver respectively receiving signals in at least two branches, said diversity receiver comprising:
   at least two demodulating means respectively provided for said at least two branches for producing respective amplitude and phases of received signals at a unit of symbol;
   memory access means for producing an amplitude ratio of said amplitude of the received signals and a phase difference between the phases of the received signals;
   phase selecting means for selecting the phase of a larger amplitude one of said received signals;
   storage means for storing at least one relative phase difference between a phase of a vector-combined signal combined based on the received signals and said phase of the larger amplitude one of the received signals for an address given by said amplitude ratio and said phase difference of said received signals, said phase of the vector-combined signal being previously calculated based on said amplitude ratio and said phase difference of the received signals and said phase of the larger amplitude one of the received signals; and
   adding means for adding said relative phase difference produced from said storage means being accessed by the amplitude ratio and the phase difference produced from the memory access means to said phase selected in the phase selecting means to produce said phase of the vector-combined signal combined based on the received signals.

4. A diversity receiver respectively receiving signals in at least two branches, the diversity receiver comprising:
   at least two demodulating means respectively provided for said at least two branches for producing respective amplitude and phases of received signals at a unit of symbol;
   memory access means for producing an amplitude ratio of said amplitude of the received signals and a phase difference between the phases of the received signals;
   phase selecting means for selecting a smaller one of said phases of the received signals;
   storage means for storing at least one relative phase difference between a phase of a vector-combined signal combined based on the received signals and smaller one of the phases of the received signals for an address given by said amplitude ratio and said phase difference of the received signals, said phase of the vector-combined signal being previously calculated based on said amplitude ratio and said phase difference of the received signals and said smaller one of the phases of the received signals; and
   adding means for adding said relative phase difference produced from said storage means being accessed by the amplitude ratio and the phase difference produced from the memory access means to said smaller one of the phases of the received signals selected in the phase selecting means to produce said phase of the vector-combined signal combined based on the received signals.

5. A diversity receiver respectively receiving signals in at least two branches, the diversity receiver comprising:
   at least two demodulating means respectively provided for said at least two branches for producing respective amplitude and phases of received signals at a unit of symbol;

memory access means for producing an amplitude ratio of said amplitude of the received signals and a phase difference between the phases of the received signals;

phase selecting means for selecting the phase of a larger amplitude one of said received signals; and storage means for storing at least one phase of a vector-combined signal combined based on the received signals for an address given by said amplitude ratio and said phase difference of the received signals and said phase of the larger amplitude one of the received signals, said phase of the vector-combined signal being previously calculated based on said amplitude ratio and said phase difference of the received signals and said phase of the larger amplitude one of the received signals;

wherein said phase of the vector-combined signal is produced from said storage means by providing to the storage means said amplitude ratio and said phase difference from the memory access means and said phase selected in the phase selecting means at the symbol unit.

6. A diversity receiver respectively receiving signals in at least two branches, the diversity receiver comprising:

at least two demodulating means respectively provided for said at least two branches for producing respective amplitude and phases of received signals at a unit of symbol;

memory access means for producing an amplitude ratio of said amplitude of the received signals and a phase difference between the phases of the received signals;

phase selecting means for selecting a smaller one of said phases of the received signals; and storage means for storing at least one phase of a vector-combined signal combined based on the received signals for an address given by said amplitude ratio and said phase difference of the received signals and said smaller one of the phases of the received signals, said phase of the vector-combined signal being previously calculated based on said amplitude ratio and said phase difference of the received signals and said smaller one of the phases of the received signals;

wherein said phase of the vector-combined signal is produced from said storage means by providing to the storage means said amplitude ratio and said phase difference from the memory access means and said smaller one of the phases of the received signals selected in the phase selecting means at the symbol unit.

7. The diversity receiver as claimed in claim 1, wherein said vector-combined signal is a signal generated by combining the received signals with squaring the respective amplitude of the received signals.

8. The diversity receiver as claimed in claim 2, wherein said vector-combined signal is a signal generated by combining the received signals with squaring the respective amplitude of the received signals.

9. The diversity receiver as claimed in claim 3, wherein said vector-combined signal is a signal generated by combining the received signals with squaring the respective amplitude of the received signals.

10. The diversity receiver as claimed in claim 4, wherein said vector-combined signal is a signal generated by combining the received signals with squaring the respective amplitude of the received signals.

11. The diversity receiver as claimed in claim 5, wherein said vector-combined signal is a signal generated by combining the received signals with squaring the respective amplitude of the received signals.

12. The diversity receiver as claimed in claim 6, wherein said vector-combined signal is a signal generated by combining the received signals with squaring the respective amplitude of the received signals.

* * * * *